US006370048B1

(12) United States Patent
Canter

(10) Patent No.: US 6,370,048 B1
(45) Date of Patent: Apr. 9, 2002

(54) AC POWER SYSTEM WITH REDUNDANT AC POWER SOURCES

(75) Inventor: Stanley Canter, Hermosa Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/816,982

(22) Filed: Mar. 23, 2001

(51) Int. Cl.[7] ............................................... H02M 7/00
(52) U.S. Cl. ........................... 363/65; 363/71; 323/906
(58) Field of Search ............................. 363/65, 71, 95; 323/906

(56) References Cited

U.S. PATENT DOCUMENTS

| | | | | |
|---|---|---|---|---|
| 4,733,341 A | * | 3/1988 | Miyazawa | 363/71 |
| 5,623,398 A | * | 4/1997 | Beach et al. | 363/65 |
| 5,682,303 A | * | 10/1997 | Goad | 336/71 |
| 5,896,281 A | * | 4/1999 | Bingley | 363/71 |
| 5,994,793 A | * | 11/1999 | Bobry | 307/64 |
| 6,259,017 B1 | * | 7/2001 | Takehara et al. | 136/293 |
| 6,275,958 B1 | * | 8/2001 | Carpenter et al. | 714/48 |
| 6,281,485 B1 | * | 8/2001 | Siri | 250/203.4 |

* cited by examiner

Primary Examiner—Bao Q. Vu
(74) Attorney, Agent, or Firm—Terje Gudmestad

(57) ABSTRACT

A redundant AC power system has at least two AC power sources, each of which includes an AC voltage supply connected to the primary winding of a source transformer. The source transformers have secondary windings with two outputs and a grounded center tap. There is a steering diode in series with each output. The redundant AC power sources supply power to one or more load systems. The output sides of the respective diodes for the two AC power sources are connected to the respective inputs of the primary winding of a load transformer with a pair of load-transformer primary inputs and a load-transformer primary center tap connectable to ground. A switch controllably connects the center tap of the load transformer to ground. A load is connected to the secondary winding of the load transformer.

12 Claims, 1 Drawing Sheet

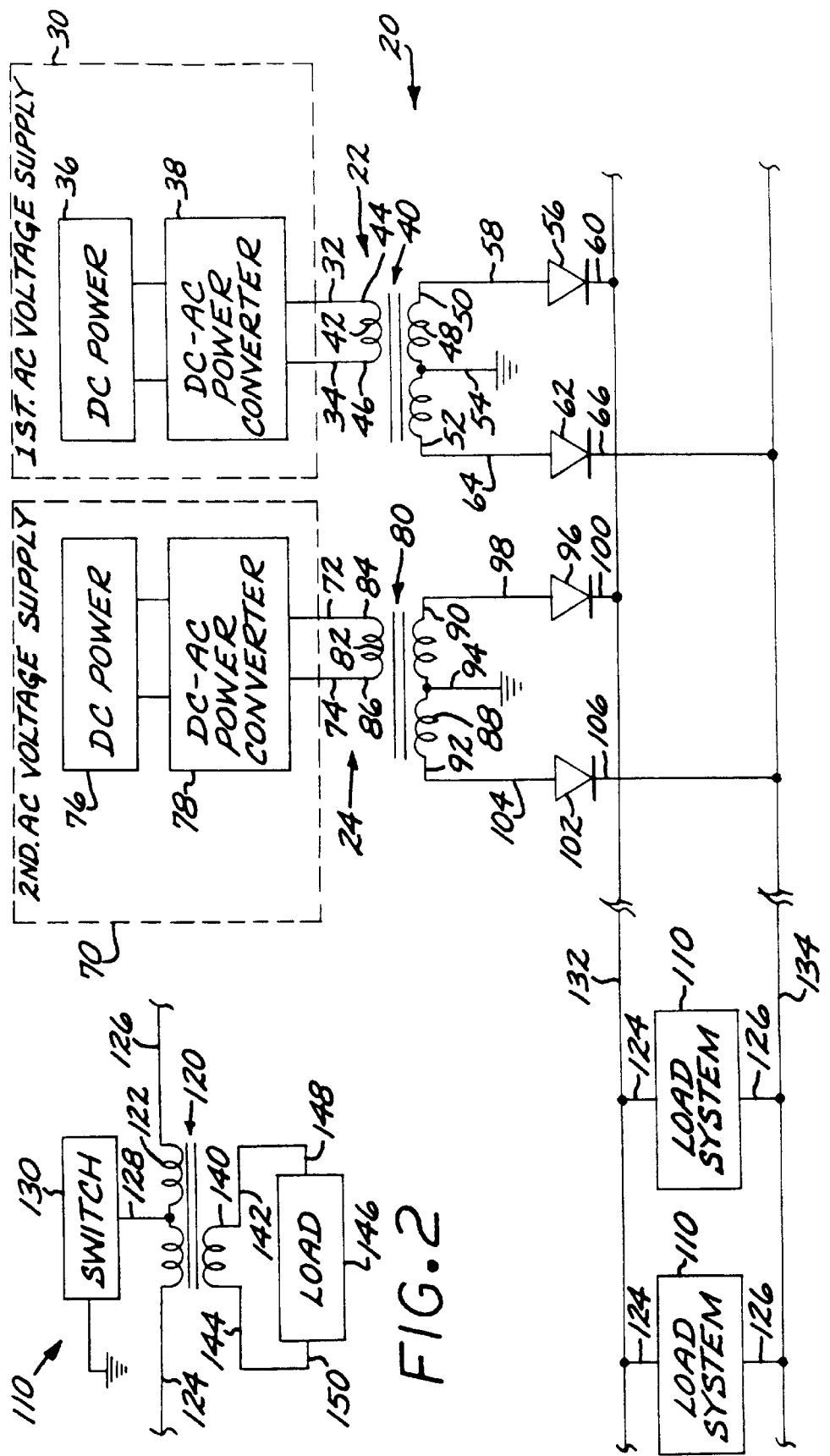

AC POWER SYSTEM WITH REDUNDANT AC POWER SOURCES

CROSS-REFERENCE TO RELATED APPLICATIONS

This application is cross-referenced to application Ser. No. 09/816,981 entitled "Distributed Converter And Method For Equalizing Lithium-ion Batteries" that is being filed simultaneously with the present invention.

TECHNICAL FIELD

This invention relates to a redundant AC power system and, more particularly, to such a power system useful in spacecraft applications.

BACKGROUND OF THE INVENTION

The source of the power in communications satellites and many other spacecraft is solar cells. The solar cells generate DC (direct current) power that is either used directly or stored in batteries that subsequently provide DC power to the various power loads in the spacecraft. DC power systems are fully satisfactory for many applications.

However, as power requirements in such spacecraft become ever-larger, it is contemplated that multiphase AC (alternating current) power will be required to deliver the requisite power levels. The generation of AC power from DC power sources is well known, and power converters are available. The use of AC power systems on spacecraft having fundamentally DC power sources such as solar cells is quite feasible.

One of the primary requirements for spacecraft having long-duration missions, such as the 15-year or more design life of a communications satellite, is fault tolerance achieved through carefully selected redundancy. The various components of each system are designed for high reliability and often have predicted lives exceeding this design life. Nevertheless, care is taken to provide redundancy so that, if a single component of any system fails, there will not be a catastrophic failure of the spacecraft.

In the case of an AC power system, it is expected that there would be multiple AC power sources to fulfill the requirements of redundancy. These multiple sources are connected in parallel to a power bus that delivers the power the various loads. If one of the AC power sources were to fail to a shorted state, it would short the entire system so that the one failure would lead to catastrophic failure of the power system.

Provision would therefore be made to remove any electrically shorted AC power source from the system before it could lead to such a result. The most straightforward approach to removing the electrically shorted AC power source is an arrangement of relays or switches on each leg of each of the AC power sources, and sensors for detecting electrical shorting. If an electrical short is sensed in one of the AC power sources, its switches or relays would be immediately operated to remove it from the source system. The current capabilities of the power system would be reduced by the current supplied by the failed power source that is removed from the power system, but the power system would continue to operate with the reduced capability.

This approach would be operable, but switches, relays, and their associated sensors and controls are heavy and bulky. Weight and volume additions to the spacecraft carry a heavy launch penalty, utilizing launch capability that could otherwise be used for other portions of the spacecraft payload. Switches and relays also are subject to degradation over time and have limited dielectrical withstanding voltage.

There is therefore a need for an AC power system that is fully redundant, but in which the features that accomplish the redundancy are of minimal weight and size. The present invention fulfills this need, and further provides related advantages.

SUMMARY OF THE INVENTION

The present invention provides an AC power system with full redundancy. The AC power system is of particular value in spacecraft applications, but it also may be used in other AC power systems. The present technique achieves redundance in a fully passive manner. No switches, relays, sensors, controls, or other heavy components are required to achieve the redundancy.

In accordance with the invention, a redundant AC (alternating power) power system comprises a first AC power source comprising a first AC voltage supply having a pair of first-supply outputs. The first AC power source has a first-source transformer with a first-source transformer primary winding having a pair of first-source transformer primary inputs each connected to a respective one of the first-supply outputs, and a first-source transformer secondary winding having a first-source transformer first output, a first-source transformer second output, and a grounded center tap. The first AC power source also includes a first-source first-output diode having an input (anode) connected to the first-source transformer first output, and an output (cathode), and a first-source second-output diode having an input (anode) connected to the first-source transformer second output, and an output (cathode). There is a similar second AC power source comprising a second AC voltage supply having a pair of second-supply outputs. The second AC power source has a second-source transformer with a second-source transformer primary winding having a pair of second-source transformer primary inputs each connected to a respective one of the second-supply outputs, and a second-source transformer secondary winding having a second-source transformer first output, a second-source transformer second output, and a grounded center tap. The second AC power source also includes a second-source first-output diode having an input (anode) connected to the second-source transformer first output (cathode), and an output, and a second-source second-output diode having an input (anode) connected to the second-source transformer second output, and an output (cathode). A load transformer has a load transformer primary winding with a pair of load transformer primary inputs and a load transformer primary center tap connectable to ground. A first one of the load transformer primary inputs is connected to the output of the first-source first-output diode and to the output of the second-source first-output diode. A second one of the load transformer primary inputs is connected to the output of the first-source second-output diode and to the output of the second-source second-output diode. Optionally but desirably, a switch is connected between the center tap of the load transformer and ground.

The load transformer preferably has a secondary winding with a pair of load transformer outputs, and wherein the power system further includes a load having two inputs, each of the load inputs connected to a respective one of the load transformer outputs. An advantage of this approach is that the power system has no switch or relay between the first AC power source and the load, and no switch or relay between the second AC power source and the load.

In one application, the first AC power source and the second AC power source are each DC-to-AC power converters. An output frequency of such first and second AC power sources is typically, but not necessarily, from about 1 kilohertz (KHz) to about 100 KHz. The first AC power source and the second AC power source may each be DC-to-AC power converters operating from a DC source such as a solar cell or a battery. In an application of particular interest, the battery may be a lithium-ion battery source.

As long as an AC voltage source is operable, the diodes permit power to flow in the two legs. If one of the AC voltage sources fails to an open-circuit condition, power from the other, operable AC voltage source(s) cannot flow to the failed voltage source because of the diodes, which thereby provide a diode steering path. No switches or relays are required to prevent the flow of power to the failed AC voltage source.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF SUMMARY OF THE DRAWING

FIG. 1 is a schematic drawing of a redundant AC power system in accordance with the invention; and FIG. 2 is a schematic drawing of a load system.

DETAILED DESCRIPTION OF THE PREFERRED EMBODIMENT

FIG. 1 depicts a redundant AC (alternating current) power system 20. The redundant AC power system 20 includes at least two AC power sources, here illustrated as a first AC power source 22 and a second AC power source 24. Additional AC power sources may be added to the redundant AC power system 20 by extensions of the indicated approach.

The first AC power source 22 comprises a first AC voltage supply 30 having a pair of first-supply outputs 32 and 34, one of which may be (but is not necessarily) grounded. The first AC voltage supply 30 may be of any type that delivers AC current, preferably in a frequency range of from about 1 KHz to about 100 KHz. In a preferred application that is illustrated, the first AC voltage supply 30 includes a source of DC power 36, which is converted to AC power by a DC-to-AC power converter 38. The source of DC power 36 may be of any operable type. Examples of sources of DC power 36 include a solar cell array and a battery such as a lithium ion battery, either alone or in combination.

A first-source transformer 40 has a first-source transformer primary winding 42 having a pair of first-source transformer primary inputs 44 and 46 each connected to a respective one of the first-supply outputs 32 and 34. The first-source transformer 40 has a first-source transformer secondary winding 48 having a first-source transformer first output 50, a first-source transformer second output 52, and a grounded center tap 54. (Equivalently for the present purposes, the center tap 54 may be maintained at some other fixed potential using a three-wire system, but the grounded center tap is preferred.)

A first-source first-output diode 56 has an input 58, connected to the first-source transformer first output 50, and an output 60, which is its cathode. For each diode discussed herein, its input (here input 58) is its anode and its output (here output 60) is its cathode. As with all diodes discussed herein, the unidirectional diode 56 is connected so that current can flow from the input 58 to the output 60, but not from the output 60 to the input 58. Also, as with all diodes discussed herein, the diode 56 may be implemented as two individual diodes in series connected in the same direction, for redundancy in the diode 56. A first-source second-output diode 62 has an input 64 connected to the first-source transformer second output 52, and an output 66.

The second AC power source 24 has components that are substantially identical with those of the first AC power source 22. The second AC power source 24 comprises a second AC voltage supply 70 having a pair of second-supply outputs 72 and 74, one of which may be (but is not necessarily) grounded. The second AC voltage supply 70 is preferably of the same type and with the same output characteristics as the first AC voltage supply 30. In the preferred application that is illustrated, the second AC voltage supply 70 includes a source of DC power 76, which is converted to AC power by a DC-to-AC power converter 78. The source of DC power 76 may be of any operable type. Examples of sources of DC power 76 include a solar cell array and a battery such as a lithium ion battery, either alone or in combination.

A second-source transformer 80 has a second-source transformer primary winding 82 having a pair of second-source transformer primary inputs 84 and 86 each connected to a respective one of the second-supply outputs 72 and 74. The second-source transformer 80 has a second-source transformer secondary winding 88 having a second-source transformer first output 90, a second-source transformer second output 92, and a grounded center tap 94. (Equivalently for the present purposes, the center tap 94 may be maintained at some other fixed potential using a three-wire system, but the grounded center tap is preferred.)

A second-source first-output diode 96 has an input 98 connected to the second-source transformer first output 90, and an output 100. A second-source second-output diode 102 has an input 104 connected to the second-source transformer second output 92, and an output 106.

The redundant AC power system 20 includes at least one load system 110, and preferably more than one load system 110 in a distributed load arrangement as illustrated. As seen in greater detail in FIG. 2, each load system 110 includes a load transformer 120 having a load transformer primary winding 122 with a pair of load transformer primary inputs 124 and 126 (also shown in FIG. 1), and a load transformer primary center tap 128 connectable to ground through a switch 130. A first one of the load transformer primary inputs 124 is connected to the output 60 of the first-source first-output diode 56 and to the output 100 of the second-source first-output diode 96, in this case through a first power distribution bus 132. A second one of the load transformer primary inputs 126 is connected to the output 66 of the first-source second-output diode 62 and to the output 106 of the second-source second-output diode 102, in this case through a second power distribution bus 134.

In the illustrated embodiment, the load transformer 120 has a secondary winding 140 with a pair of load transformer outputs 142 and 144. A load 146 has two inputs 148 and 150. Each of the load inputs 148 and 150 is connected to a respective one of the load transformer outputs 142 and 144.

The switch 130 is placed in the ground return of the circuits between the power sources 22 and 24, and the load 146. Consequently, no galvanic isolation is required, and the switch 130 operates at a low voltage. The power to the load 146 may be shut off by opening this switch 130, which opens the returns through both halves of the circuit.

In this preferred embodiment, there are no switches or relays between the respective AC power sources 22 and 24, and the load 146 to switch power in the event that one of the AC power sources 22 or 24 fails to a shorted condition. (The switch 130 is not between the AC power sources 22 and 24, and the load 146.)

In normal operation, both of the AC power sources 22 and 24 are in operation, delivering power to the load 146. If one of the AC power sources, such as the AC power source 24, fails to a shorted condition, its output diodes 96 and 102 prevent current from the remaining operable AC power source(s) from shorting through the failed AC power source. Power to the load 146 is thereafter supplied by the remaining active AC power sources.

The present invention has been reduced to practice according to the approach described and operated. It functioned as discussed above.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A redundant AC power system, comprising:
   a first AC power source comprising
      a first AC voltage supply having a pair of first-supply outputs,
      a first-source transformer having
         a first-source transformer primary winding having a pair of first-source transformer primary inputs each connected to a respective one of the first-supply outputs, and
         a first-source transformer secondary winding having a first-source transformer first output, a first-source transformer second output, and a center tap at a first fixed potential,
      a first-source first-output diode having an input connected to the first-source transformer first output, and an output, and
      a first-source second-output diode having an input connected to the first-source transformer second output, and an output;
   a second AC power source comprising
      a second AC voltage supply having a pair of second-supply outputs,
      a second-source transformer having
         a second-source transformer primary winding having a pair of second-source transformer primary inputs each connected to a respective one of the second-supply outputs, and
         a second-source transformer secondary winding having a second-source transformer first output, a second-source transformer second output, and a center tap at a second fixed potential,
      a second-source first-output diode having an input connected to the second-source transformer first output, and an output, and
      a second-source second-output diode having an input connected to the second-source transformer second output, and an output; and
   a load transformer having a load transformer primary winding with a pair of load-transformer primary inputs, wherein
      a first one of the load-transformer primary inputs is connected to the output of the first-source first-output diode and to the output of the second-source first-output diode, and
      a second one of the load-transformer primary inputs is connected to the output of the first-source second-output diode and to the output of the second-source second-output diode.

2. The power system of claim 1, wherein the load transformer primary winding further includes
   a load-transformer primary center tap, and wherein the power system further includes
   a switch connected between the load transformer primary center tap of the load transformer and ground.

3. The power system of claim 1, wherein the load transformer has a secondary winding with a pair of load-transformer outputs, and wherein the power system further includes
   a load having two inputs, each of the load inputs being connected to a respective one of the load-transformer outputs.

4. The power system of claim 3, wherein the power system has no switch between the first AC power source and the load.

5. The power system of claim 3, wherein the power system has no relay between the first AC power source and the load.

6. The power system of claim 1, wherein the first AC power source and the second AC power source are each DC-to-AC power converters.

7. The power system of claim 1, wherein the first AC power source and the second AC power source are each DC-to-AC power converters operating from a DC battery source.

8. The power system of claim 1, wherein the first AC power source and the second AC power source are each DC-to-AC power converters operating from a lithium-ion battery source.

9. The power system of claim 1, wherein the first AC power source and the second AC power source each have an output frequency of from about 1 KHz to about 100 KHz.

10. The power system of claim 1, wherein each diode comprises a pair of redundant diodes in series.

11. The power system of claim 1, wherein the first fixed potential and the second fixed potential are both ground.

12. The power system of claim 1, further including
    at least one additional load transformer connected in parallel with the load transformer.

* * * * *